(12) United States Patent
Chang et al.

(10) Patent No.: US 11,035,996 B2
(45) Date of Patent: Jun. 15, 2021

(54) LIGHT GUIDE PLATE, BACKLIGHT MODULE, AND DISPLAY DEVICE

(71) Applicants: Radiant(Guangzhou) Opto-Electronics Co., Ltd, Guangdong (CN); Radiant Opto-Electronics Corporation, Kaohsiung (TW)

(72) Inventors: Chia-Yin Chang, Kaohsiung (TW); Chin-Ting Weng, Kaohsiung (TW); Hao Chen, Kaohsiung (TW); Yi-Ching Chung, Kaohsiung (TW)

(73) Assignees: Radiant(Guangzhou) Opto-Electronics Co., Ltd, Guangdong (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 16/830,257

(22) Filed: Mar. 25, 2020

(65) Prior Publication Data

US 2020/0225403 A1  Jul. 16, 2020

Related U.S. Application Data

(63) Continuation-in-part of application No. PCT/CN2018/086694, filed on May 14, 2018.

(30) Foreign Application Priority Data

Apr. 26, 2019  (CN) .......................... 201910342677.6

(51) Int. Cl.
*F21V 8/00* (2006.01)
*G06F 1/16* (2006.01)

(52) U.S. Cl.
CPC .......... *G02B 6/0053* (2013.01); *G02B 6/0078* (2013.01); *G06F 1/1609* (2013.01)

(58) Field of Classification Search
CPC .. G02B 6/0053; G02B 6/0061; G02B 6/0055; G02B 6/0038; G02B 6/0035; G02B 6/0036; G02B 6/0016; G02B 6/0063
See application file for complete search history.

(56) References Cited

U.S. PATENT DOCUMENTS 7,845,840 B2 * 12/2010 Fang .................... G02B 6/0038
362/620
8,186,867 B2   5/2012 Chen et al.
(Continued)

FOREIGN PATENT DOCUMENTS

CN    101329423 A   12/2008
CN    102853336 A    1/2013
(Continued)

*Primary Examiner* — Peggy A Neils
(74) *Attorney, Agent, or Firm* — CKC & Partners Co., LLC

(57) ABSTRACT

A light guide plate includes a main body, stripe structures, and light-adjusting structures. The main body includes a light-incident surface and an optical surface. The stripe structures are disposed on the optical surface. The light-adjusting structures are disposed between two adjacent stripe structures. Each of the light-adjusting structures includes a first light active surface and a second light active surface. The first light active surface faces towards the light-incident surface. The second light active surface faces towards an opposite light-incident surface. The first light active surface and the second light active surface are inclined towards different directions and formed a non-symmetrical shape. A first included angle is formed between the first light active surface and the optical surface. A second included angle is formed between the second light active surface and the optical surface. The first included angle and the second included angle are acute angles.

18 Claims, 10 Drawing Sheets

(56) References Cited

U.S. PATENT DOCUMENTS

| | | | |
|---|---|---|---|
| 9,207,383 B2* | 12/2015 | Kim | G02B 6/0035 |
| 9,435,936 B2* | 9/2016 | Chang | G02B 6/0036 |
| 2015/0226901 A1* | 8/2015 | Lee | G02B 6/0036 |
| | | | 362/607 |
| 2015/0346414 A1 | 12/2015 | Chang et al. | |
| 2017/0269285 A1* | 9/2017 | Hirayama | G02B 6/0036 |
| 2019/0235150 A1* | 8/2019 | Hsu | G02B 6/0061 |

FOREIGN PATENT DOCUMENTS

| | | |
|---|---|---|
| CN | 103375741 A | 10/2013 |
| CN | 103424801 A | 12/2013 |
| CN | 103438390 A | 12/2013 |
| CN | 104948998 B | 10/2017 |
| JP | 2010-210882 A | 9/2010 |
| TW | I349121 B | 9/2011 |
| TW | I443426 B | 7/2014 |
| TW | I481915 B | 4/2015 |

* cited by examiner

LIGHT GUIDE PLATE, BACKLIGHT MODULE, AND DISPLAY DEVICE

RELATED APPLICATIONS

This application is a continuation-in-part application of International Application No. PCT/CN2018/086694 filed on May 14, 2018, and this application also claims priority from China Patent Application Serial Number 201910342677.6, filed on Apr. 26, 2019. The entire contents of each of which are incorporated by reference.

BACKGROUND

Field of Invention

The present invention relates to a light guide device and its applications. More particularly, the present invention relates to a light guide plate and its applications to a backlight module and a display device.

Description of Related Art

A light guide plate has a light-incident surface, a light-emitting surface and a reflective surface. Light provided by a light source enters the light guide plate from the light-incident surface, and exits from the light-emitting surface.

Simultaneously referring to FIG. 1A and FIG. 1B, FIG. 1A is a schematic diagram showing a conventional microstructure 10 of U.S. Patent Application Publication No. 2015/0346414 A, and FIG. 1B is a schematic diagram showing an operation of processing a mold for forming the microstructure shown in the FIG. 1A. The microstructure 10 shown in FIG. 1A mainly includes a first optical surface 11, a second optical surface 12 and a side portion 13, in which one of the first optical surface 11 and the second optical surface 12 faces towards the light-incident surface of the light guide plate, and the other one of the first optical surface 11 and the second optical surface 12 faces away from the light-incident surface. Although the design of the microstructure 10 can change the light emitting angle and light directivity after light emitted from the light guide plate so as to improve light emitting efficiency and appearance uniformity, some problems still exist in the microstructure 10 as follows.

For example, as shown in FIG. 1B, during the operation of processing a mold M1, a feeding path and a retracting path of a cutting tool K1 have to be inclined relative to the mold M1 to form the side portion 13 of the microstructure 10 with an inclined structure. The side portion 13 of the microstructure 10 does not face towards or away from the light-incident surface of the light guide plate, that is, the side portion 13 of the microstructure 10 is not in a traveling direction of light, and thus does not make a contribution to guiding the light to leave the light guide plate. Moreover, because the side portion 13 is directly connected to the optical surface (that is a flat surface) of the light guide plate, the total internal reflection principle of the original flat surface will not meet, thus causing the light to leak from the connection between the side portion 13 and the optical surface of the light guide plate. Furthermore, different inclined angles between the first optical surface 11 and the second optical surface 12 cause the side portion 13 to have different slopes and surface areas, and thus the light-emitting effect of the microstructure 10 is difficult to be controlled. Moreover, the aforementioned operation of processing the mold M1 also takes more processing time.

SUMMARY

The invention provides a light guide plate having microstructures which do not cause the light leakage problem, thereby increasing a utilization rate of light.

According to the aforementioned object, a light guide plate is provided. The light guide plate includes a main body, plural stripe structures, and plural light-adjusting structures. The main body includes a light-incident surface and an optical surface connected to the light-incident surface. The stripe structures are disposed on the optical surface. The light-adjusting structures are disposed between every two adjacent stripe structures, in which each of the light-adjusting structures includes a first light active surface and a second light active surface connected to the first light active surface. The first light active surface faces towards the light-incident surface, and the second light active surface faces towards a side of the main body which is opposite to the light-incident surface. The first light active surface and the second light active surface are inclined towards different directions and formed a non-symmetrical shape, and a first included angle is formed between the first light active surface and the optical surface, and a second included angle is formed between the second light active surface and the optical surface. Each of the first included angle and the second included angle is an acute angle.

According to an embodiment of the present invention, side edges of the first light active surface and the second light active surface of each of the light-adjusting structures are connected to surfaces of the striped structures adjacent thereto.

According to an embodiment of the present invention, an extending direction of each of the striped structures is vertical to an extending direction of the light-incident surface.

According to an embodiment of the present invention, the main body has an opposite light-incident surface which is opposite to the light-incident surface. One end of each of the striped structures is connected to the light-incident surface, and the other end of each of the striped structures is connected to the opposite light-incident surface.

According to an embodiment of the present invention, the first angle is greater than the second angle.

According to an embodiment of the present invention, the light-adjusting structures are continuously or non-continuously arranged along the striped structures.

According to an embodiment of the present invention, the light-adjusting structures are arranged along the striped structures. Each of the light-adjusting structures has a size which becomes greater with increased distance from the light-incident surface.

According to an embodiment of the present invention, the light-adjusting structures are arranged along the striped structures. Distances between any every two adjacent light-adjusting structures decrease along a direction from the light-incident surface to an opposite light-incident surface which is opposite to the light-incident surface.

According to an embodiment of the present invention, each of the striped structures is a convex structure or a concave structure.

According to an embodiment of the present invention, the optical surface is a light-emitting surface or a reflecting surface.

According to an embodiment of the present invention, the striped structures are continuously arranged or non-continuously arranged.

According to an embodiment of the present invention, the first light active surface and the second light active surface of each of the light-adjusting structures are continuously arranged along a direction which is vertical to the light-incident surface. The first light active surface and the second light active surface of each of the light-adjusting structures are connected to form a junction line, wherein the junction line is parallel to the light-incident surface. Each of the first light active surface and the second light active surface of each of the light-adjusting structures has an end edge and two side edges, in which the end edge is parallel to the junction line, and the side edges are not parallel to the junction line, and the side edges are connected to surfaces of the adjacent striped structures.

According to an embodiment of the present invention, a portion of each of the light-adjusting structures overlaps with its adjacent stripe structures.

According to an embodiment of the present invention, each of the light-adjusting structures comprises a first flank portion and a second flank portion, and the first flank portion and the second flank portion of each of the light-adjusting structures are respectively located at two opposite sides of the junction line and overlap with their adjacent stripe structures.

According to an embodiment of the present invention, each of the stripe structures has side edges, and a distance between the side edges of two adjacent stripe structures is the same from one end of each of the stripe structures located near the light-incident surface to the other end of each of the stripe structures located away from the light-incident surface.

According to an embodiment of the present invention, each of the stripe structures has side edges, and a distance between the side edges of two adjacent stripe structures is gradually decreasing from one end of each of the stripe structures located near the light-incident surface to the other end of each of the stripe structures located away from the light-incident surface.

According to the aforementioned object, a backlight module is provided. The backlight module includes an aforementioned light guide plate, at least one film, a reflecting film and a light source. The film is disposed in front of the light guide plate. The reflecting film is disposed behind the light guide plate. The light source is disposed adjacent to the light-incident surface of the light guide plate.

According to the aforementioned object, a display device is provided. The display device includes an aforementioned light guide plate, at least one film, a reflecting film, a light source and a display panel. The film is disposed in front of the light guide plate. The reflecting film is disposed behind the light guide plate. The light source is disposed adjacent to the light-incident surface of the light guide plate. The display panel is disposed in front of the at least one film.

According to the aforementioned embodiments of the present invention, the light guide plate of the present invention has stripe structures and light-adjusting structures disposed between every two adjacent stripe structures, such that the stripe structures are directly formed as side portions of the light-adjusting structures, thereby preventing the light leakage problem on the sides of the conventional microstructures. In other words, because each of the light-adjusting structures is not directly connected to the flat surface of the light guide plate, the light leakage problem due to the connections between the convention microstructures and the flat optical surface of the light guide plate as described in the "Description of Related Art" can be resolved. In addition, the light active surfaces of each of the light-adjusting structures have different inclinations, which can increase the amount of light reflection or guide the light, thereby increasing light utilization efficiency. Because the stripe structures are directly formed as side portions of the light-adjusting structures, the processing time of the light guide plate can be reduced, and the inclination of the light active surfaces can be precisely controlled, thereby achieving required optical effect.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1B:
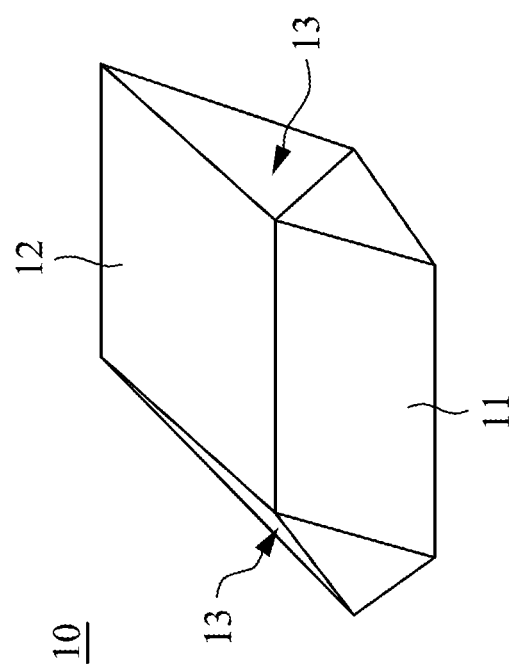
FIG. 1B is a schematic diagram showing an operation of processing a mold for forming the microstructure shown in the FIG. 1A.
Figure 1A:
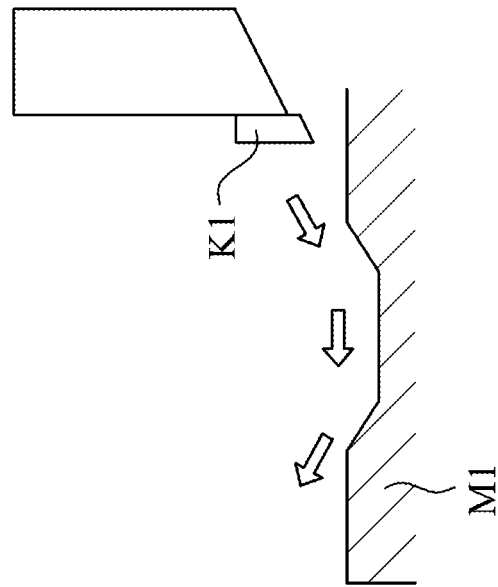
FIG. 1A is a schematic diagram showing a conventional microstructure of U.S. Patent Application Publication No. 2015/0346414 A.

Reference will now be made in detail to the present embodiments of the invention, examples of which are illustrated in the accompanying drawings. Wherever possible, the same reference numbers are used in the drawings and the description to refer to the same or like parts.

Figure 2A:
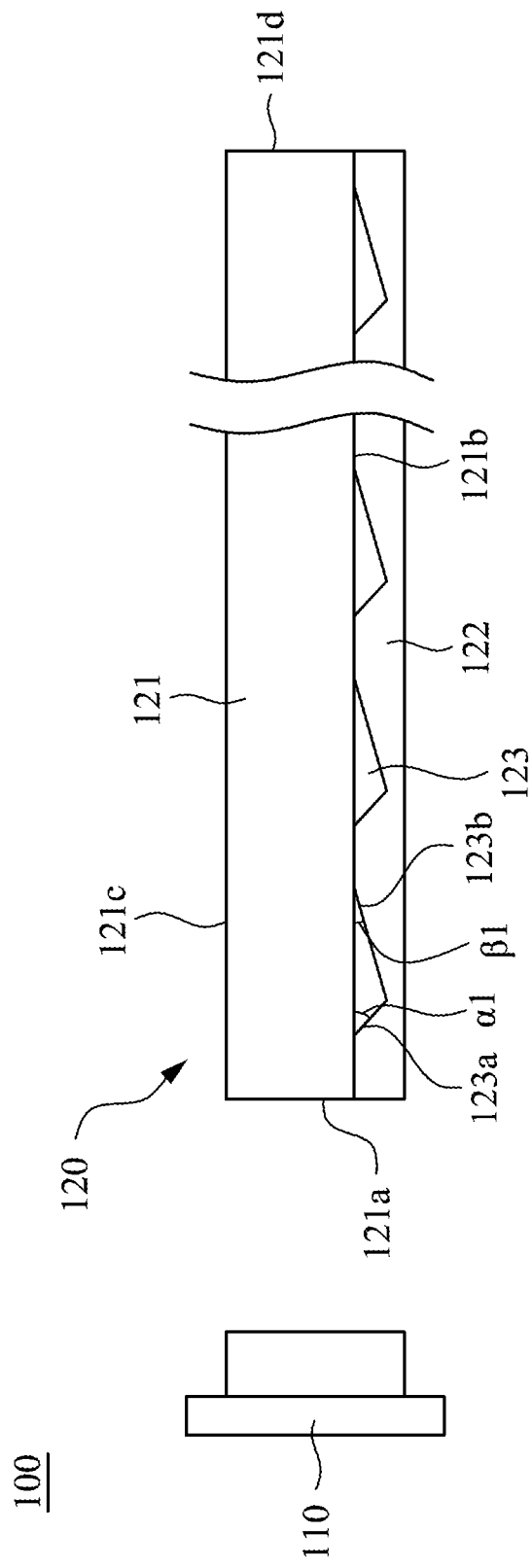
FIG. 2A is a schematic diagram showing a backlight module in accordance with a first embodiment of the present invention.
Figure 2B:
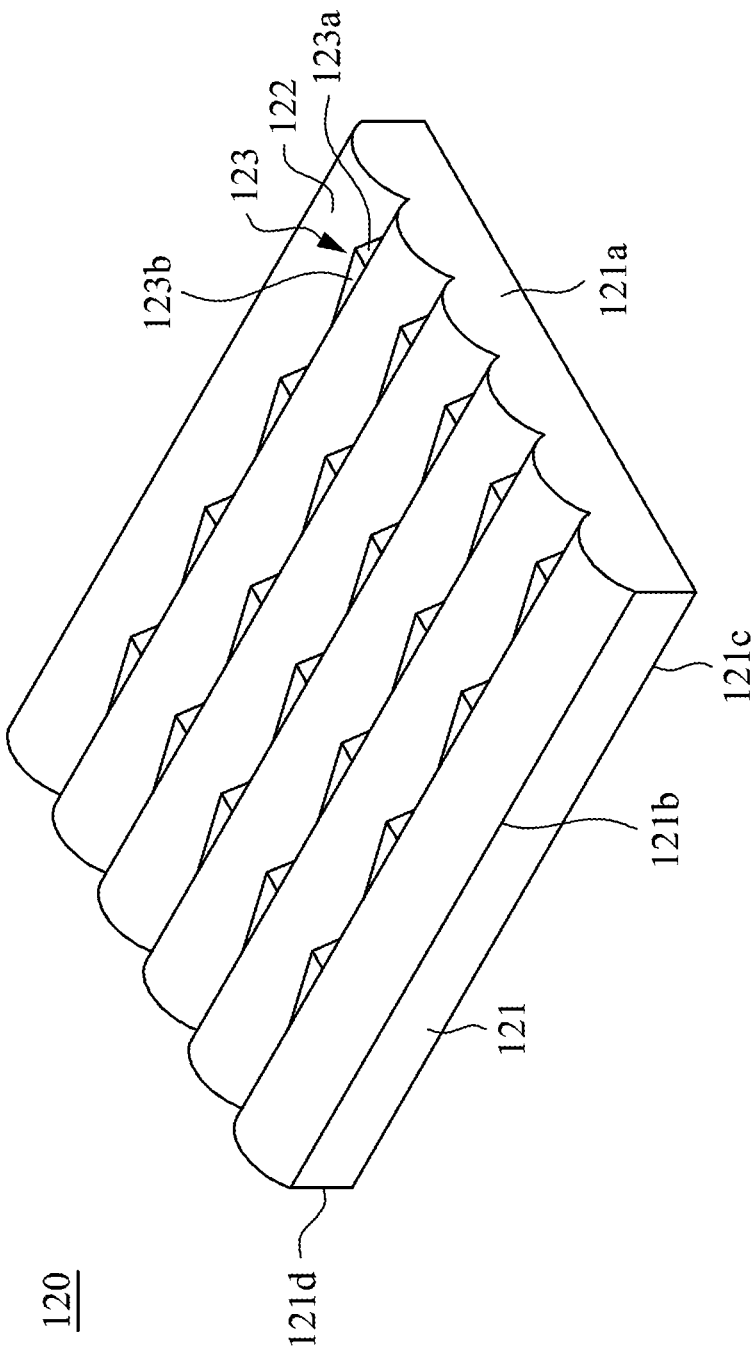
FIG. 2B is a structural diagram showing a light guide plate in accordance with the first embodiment of the present invention.

Simultaneously referring to FIG. 2A and FIG. 2B, FIG. 2A and FIG. 2B are respectively a schematic diagram showing a backlight module 100 and a structural diagram showing a light guide plate 120 in accordance with a first embodiment of the present invention. The backlight module 100 of the present embodiment mainly includes a light source 110 and the light guide plate 120. The light guide plate 120 has a main body 121, plural stripe structures 122 and plural light-adjusting structures 123. The main body 121 has a light-incident surface 121a and optical surfaces, such as a reflective surface 121b, a light-emitting surface 121c and an opposite light-incident surface 121d. The light-incident surface 121a is opposite to the opposite light-incident surface 121d, and the reflective surface 121b and the light-emitting surface 121c are respectively connected to two opposite sides of the light-incident surface 121a. The light source 110 is disposed adjacent to the light-incident surface 121a of the light guide plate 120 and is used to provide light beam to the light guide plate 120.

Continuously referring to FIG. 2A and FIG. 2B, in the present embodiment, the stripe structures 122 are disposed on the reflective surface 121b, and an extending direction of the stripe structures 122 is vertical to an extending direction of the light-incident surface 121a. Each of the stripe structures 122 extends from the light-incident surface 121a to the opposite light-incident surface 121d. In other words, one end of each of the stripe structures 122 is connected to the light-incident surface 121a, and the other end of each of the stripe structures 122 is connected to the opposite light-incident surface 121d. In the present embodiment, the stripe structures 122 are continuously arranged along a direction which is parallel to the extending direction of the light-incident surface 121a.

As shown in FIG. 2A and FIG. 2B, the light-adjusting structures 123 are disposed between every two adjacent stripe structures 122. In the present embodiment, the stripe structures 122 and the light-adjusting structures 123 are convex structures. Each of the light-adjusting structures 123 has a first light active surface 123a and a second light active surface 123b, in which the second light active surface 123b is connected to the first light active surface 123a, and side edges of the first light active surface 123a and the second light active surface 123b of each of the light-adjusting structures 123 are connected to surfaces of the stripe structures 122 which are adjacent to the light-adjusting structures 123. The first light active surface 123a and the second light active surface 123b are inclined towards different directions and formed a non-symmetrical shape. The first light active surface 123a faces towards the light-incident surface 121a and is inclined relative to the reflective surface 121b, and a first included angle α1 is formed between the first light active surface 123a and the reflective surface 121b. The second light active surface 123b faces towards the opposite light-incident surface 121d and is inclined relative to the reflective surface 121b, and a second included angle β1 is formed between the second light active surface 123b and the reflective surface 121b. Both the first included angle α1 and the second included angle β1 are acute angles. In some present embodiments, the first included angle α1 is different from the second included angle β1. In other words, each of the light-adjusting structures 123 has an asymmetric triangle shape when viewed from a side (as shown in FIG. 2A). In the present embodiment, the first included angle α1 is greater than the second included angle β1. Therefore, most of the light entering the light guide plate 120 from the light-incident surface 121a is emitted towards the second light active surface 123b and is further reflected by the second light active surface 123b. In other words, the second light active surface 123b is a surface which receives light directly. In the structural design of each of the light-adjusting structures 123, an area of the second light active surface 123b is greater than an area of the first light active surface 123a, so as to increase the amount of light reflection, thereby increasing light utilization efficiency. In addition, side edges of each of the light-adjusting structures 123 are connected to surfaces of adjacent stripe structures 122, such that the stripe structures 122 are formed as side portions of the light-adjusting structures 123, thereby preventing the light leakage problem on the sides of the conventional microstructures. In other words, the light-adjusting structures 123 are directly connected to the stripe structures 122 instead of being connected to the light-emitting surface 121c or the reflective surface 121b of the light guide plate 120, thus resolving the light leakage problem due to the connections between the convention microstructures and the flat optical surface (such as light-emitting surface or reflective surface of the light guide plate) as described in the "Description of Related Art".

Figure 3A:
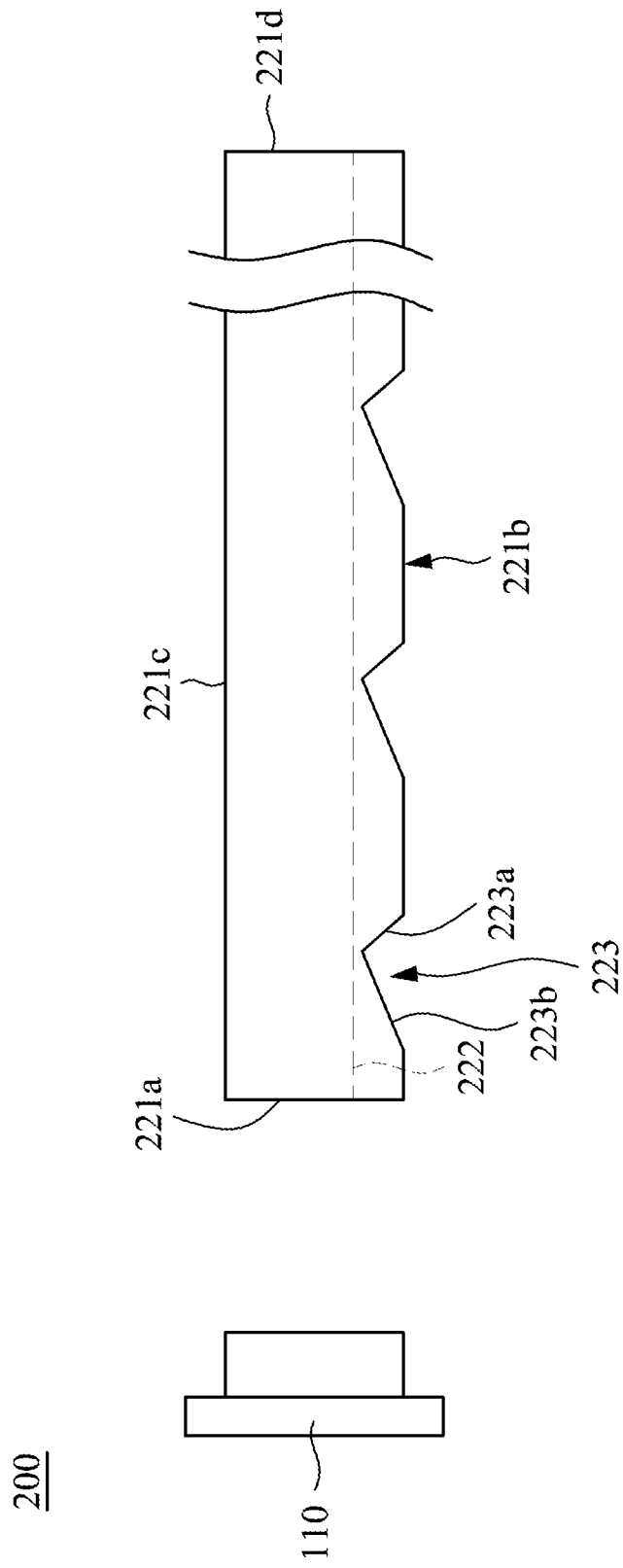
FIG. 3A is a schematic diagram showing a backlight module in accordance with a second embodiment of the present invention.
Figure 3B:
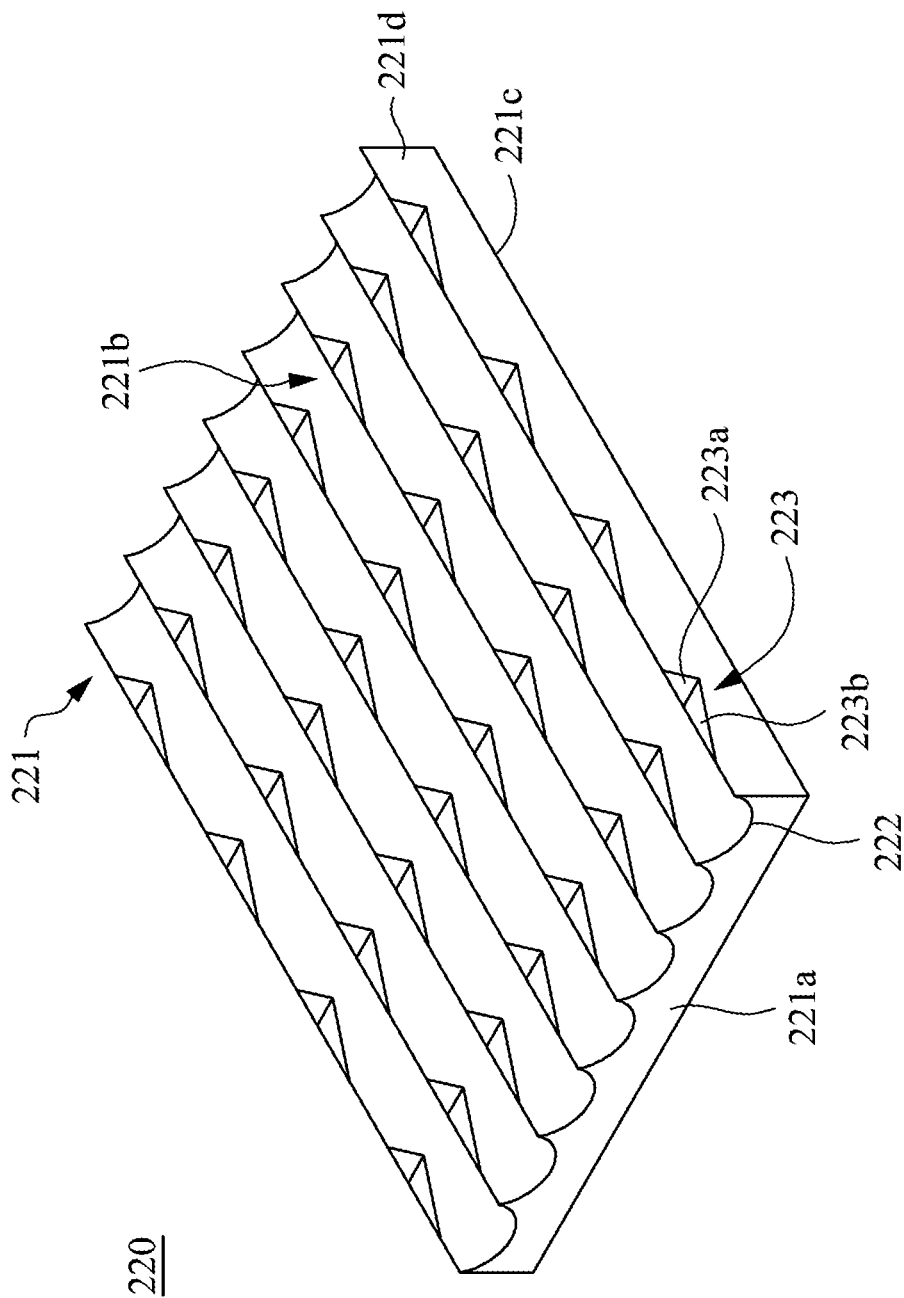
FIG. 3B is a structural diagram showing a light guide plate in accordance with the second embodiment of the present invention.

It is noted that, the stripe structures and the light-adjusting structures which are convex structures are merely used as an example for explanation, and embodiments of the present invention are not limited thereto. In other embodiments, the light guide plate has different designs. Referring to FIG. 3A and FIG. 3B, FIG. 3A and FIG. 3B. 2B are respectively a schematic diagram showing a backlight module 200 and a structural diagram showing a light guide plate 220 in accordance with a second embodiment of the present invention. As shown in FIG. 3A, the backlight module 200 of the present embodiment mainly includes a light source 110 and the light guide plate 220. The light guide plate 220 of the present embodiment has a main body 221, plural stripe structures 222 and plural light-adjusting structures 223. The main body 221 has a light-incident surface 221a, a reflective surface 221b, a light-emitting surface 221c and an opposite light-incident surface 221d.

Referring to FIG. 3B, the stripe structures 222 are disposed on the reflective surface 221b. In the present embodiment, the light-adjusting structures 223 are disposed between every two adjacent stripe structures 222, and the stripe structures 222 and the light-adjusting structures 223 are concave structures. The design of the light-adjusting structures 223 in the present embodiment is similar to that of the aforementioned light-adjusting structures 123. Each of the light-adjusting structures 223 has a first light active surface 223a and a second light active surface 223b, and the first light active surface 223a faces towards the light-incident surface 221a, and the second light active surface 223b faces towards the opposite light-incident surface 221d. The first light active surface 223a and the second light active surface 223b are inclined towards different directions and formed a non-symmetrical shape. In other words, the first light active surface 223a and the second light active surface 223b are inclined relative to the reflective surface 221b at different angles. Moreover, the area of the second light active surface 223b which receives light directly can be designed to be greater than the area of the first light active surface 223a, so as to increase the amount of light reflection, thereby increasing light utilization efficiency. In addition, the side edges of each of the light-adjusting structures 223 are connected to the surfaces of the adjacent stripe structures 222, so that the stripe structures 222 are formed as side portions of the light-adjusting structures 223, thus preventing the light leakage problem on the sides of the conventional microstructures. In other words, the light-adjusting structures 223 are directly connected to the stripe structures 222 instead of being connected to the flat optical surface (i.e. Light-emitting surface 221c or the reflective surface 221b) of the light guide plate 220, thus resolving the light leakage problem due to the connections between the convention microstructures and the flat optical surface of the light guide plate as described in the "Description of Related Art". Moreover, since the adjusting structures 223 are concave structures, tips of the adjusting structures 223 are located inside of the stripe structures 222, which can reduce a contact area between the light guide plate 220 and the reflecting film located under the light guide plate 220, so as to avoid the occurrence of adsorption between the reflecting film and the light guide plate 220. Moreover, while traveling inside the light guide plate 220, the light beam is not interfered by the transition of the light-adjusting structures 223, and the area of the second light active surface 223b which receives light can be designed to be larger, which can effectively improve the overall luminance of the light guide plate 220.

Figure 4:
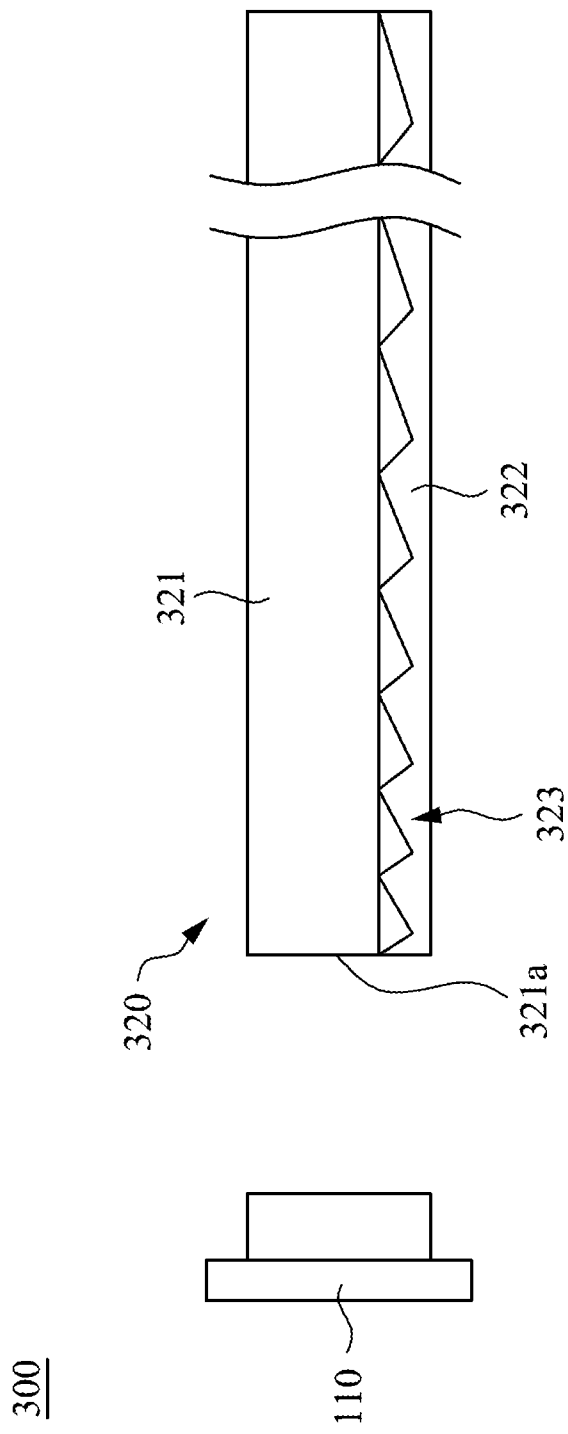
FIG. 4 is a schematic diagram showing a backlight module in accordance with a third embodiment of the present invention.

In the aforementioned embodiments, the light-adjusting structures which have the same size and are non-continuously arranged are not used to limit the present invention. In other embodiments, the size of each of the light-adjusting structures can be designed according to the distance between each of the light-adjusting structures and the light-incident surface. Referring to FIG. 4, FIG. 4 is a schematic diagram showing a backlight module 300 in accordance with a third embodiment of the present invention. The structure of the backlight module 300 of the present embodiment is similar to that of the backlight module 100 shown in FIG. 2A, and the main difference therebetween is that a light guide plate 320 of the backlight module 300 has different designs.

Continuously referring to FIG. 4, the light guide plate 320 includes a main body 321, plural stripe structures 322 and plural light-adjusting structures 323. In the present embodiment, the stripe structures 322 are disposed on the main body 321, in which an extending direction of the stripe structures 322 is vertical to a light-incident surface 321a of the main body 321. In the present embodiment, the stripe structures 322 are convex structures, and the light-adjusting structures 323 are disposed between and along the stripe structures 322. In addition, the design of the light-adjusting structures 323 are the similar to that of the aforementioned light-adjusting structures 123 and 223, and therefore will not be described again herein.

As shown in FIG. 4, in the present embodiment, each of the light-adjusting structures 323 has a size which becomes greater with increased distance from the light-incident surface 321a. In other words, sizes of the light-adjusting structures 323 located away from the light-incident surface 321a are greater than sizes of the light-adjusting structures 323 located near the light-incident surface 321a, thereby increasing the amount of light emitted from a location of the light guide plate 320 which is away from the light-incident surface 321a and increasing the overall light uniformity of the light guide plate 320.

Figure 5:
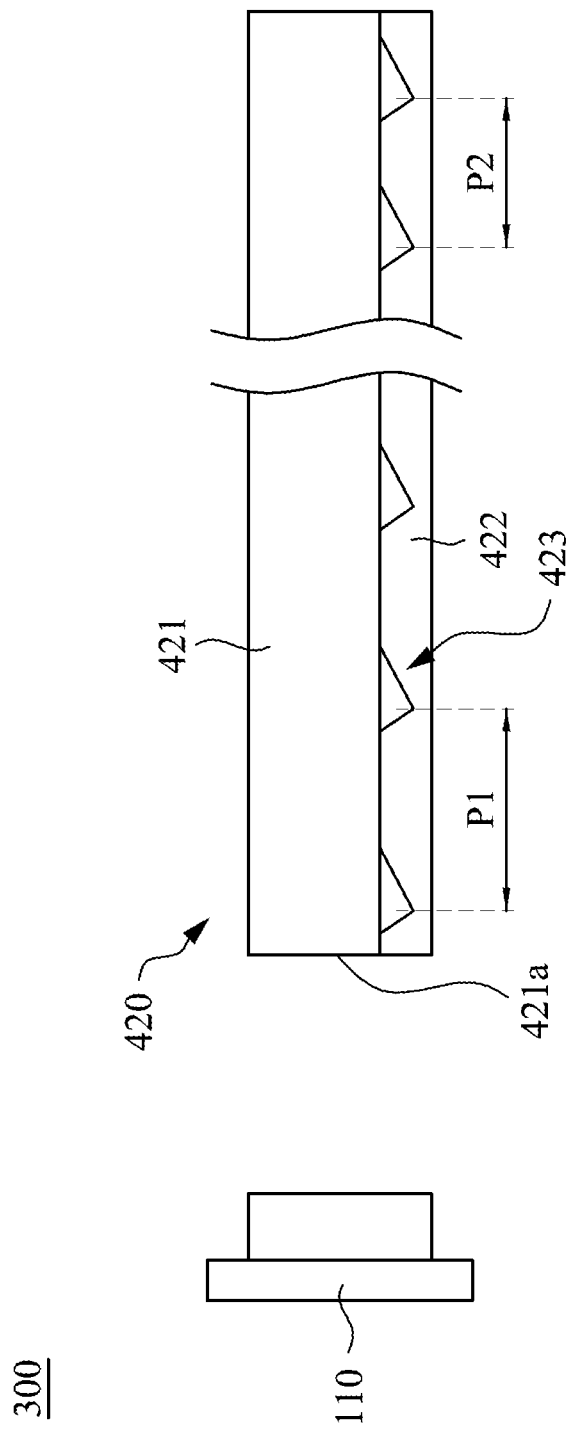
FIG. 5 is a schematic diagram showing a backlight module in accordance with a fourth embodiment of the present invention.

In the aforementioned embodiment, a pitch between two adjacent light-adjusting structures can be designed according to distances between the light-adjusting structures and the light-incident surface. Referring to FIG. 5, FIG. 5 is a schematic diagram showing a backlight module 400 in accordance with a fourth embodiment of the present invention. The structure of the backlight module 400 of the present embodiment is similar to that of the backlight module 100 shown in FIG. 2A, and the main difference therebetween is that a light guide plate 420 of the backlight module 400 has different designs.

Referring to FIG. 5 again, the light guide plate 420 includes a main body 421, plural stripe structures 422 and plural light-adjusting structures 423. In the present embodiment, the stripe structures 422 are disposed on the main body 421. An extending direction of the stripe structures 422 is vertical to a light-incident surface 421a of the main body 421. In the present embodiment, the stripe structures 422 are convex structures, and the light-adjusting structures 423 are disposed between and along the stripe structures 422. In addition, the design of the light-adjusting structures 423 are the similar to that of the aforementioned light-adjusting structures 123 and 223, and therefore will not be described again herein.

As shown in FIG. 5, in the present embodiment, pitches between every two adjacent light-adjusting structures 423 decrease along a direction from the light-incident surface 421a to an opposite light-incident surface 421a away from the light-incident surface 421a. The "pitch" refers to a distance between two adjacent light-adjusting structures 423 which is parallel to the extending direction of the stripe structures 422. In other words, a pitch P2 between every two adjacent light-adjusting structures 423 which are away from the light-incident surface 421a is smaller than a pitch P1 between two adjacent light-adjusting structures 423 which are near the light-incident surface 421a. Therefore, by densely arranging the light-adjusting structures 423 on a portion of the light guide plate 420 which is away from the light-incident surface 421a, the amount of light emitted from the portion of the light guide plate 420 away from the light-incident surface 321a and the overall light uniformity of the light guide plate 420 can be increased accordingly.

Figure 6:
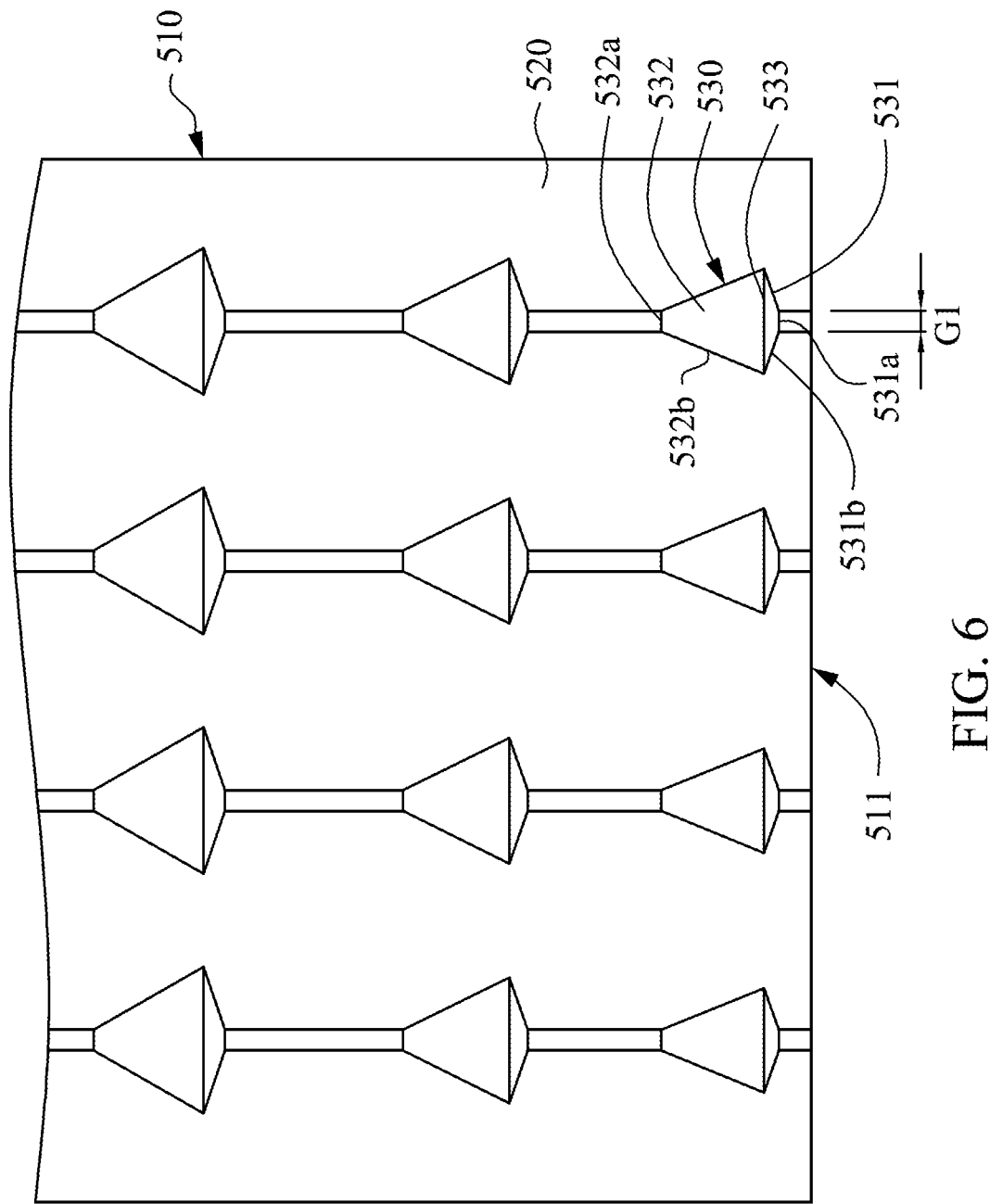
FIG. 6 is a schematic partial structural diagram showing a light guide plate in accordance with a fifth embodiment of the present invention.

In the aforementioned embodiment, the stripe structures are continuously arranged along the light-incident surface. In other embodiments, the stripe structures are non-continuously arranged along the light-incident surface. Referring to FIG. 6, FIG. 6 is a schematic partial structural diagram showing a light guide plate 500 in accordance with a fifth embodiment of the present invention. The light guide plate 500 includes a main body 510, plural stripe structures 520 and plural light-adjusting structures 530. An extending direction of the tripe structures 520 is vertical to a light-incident surface 511 of the main body 510. In the present embodiment, the stripe structures 520 are non-continuously arranged along a direction which is parallel to the light-incident surface 511. In other words, a distance G1 is formed between every adjacent two stripe structures 520, and because a width of each of the stripe structures 520 is consistent from one end near the light-incident surface 511 to the other end away from the light-incident surface 511, the distance G1 has a constant width.

As shown in FIG. 6, the light-adjusting structures 530 are disposed between every two adjacent stripe structures 520. In addition, each of the light-adjusting structures 530 has a first light active surface 531 and a second light active surface 532, and the first light active surface 531 faces towards the light-incident surface 511, and the second light active surface 532 faces away from the light-incident surface 511. In the present embodiment, the first light active surface 531 and the second light active surface 532 of each of the light-adjusting structures 530 are continuously arranged along a direction which is vertical to the light-incident surface 511. The first light active surface 531 and the second light active surface 532 of each of the light-adjusting structures 530 are connected to form a junction line 533, and each of the junction lines 533 is parallel to the light-incident surface 511. In addition, each of the first light active surfaces 531 has an end edge 531a and two side edges 531b, in which the end edge 531a is parallel to the junction line 533, and the side edges 531b are not parallel to the junction line 533 and are directly connected to the surfaces of the adjacent stripe structures 520. Similarly, each of the second light active surfaces 532 has an end edge 532a and two side edges 532b, in which the end edge 532a is parallel to the junction line 533, and the side edges 532b are not parallel to the junction line 533 and are directly connected to the surfaces of the adjacent stripe structures 520. Therefore, at least one portion of each of the light-adjusting structures 530 overlaps with the adjacent stripe structures 520. More specifically, two opposite side portions of each of the light-adjusting structures 530 are directly connected (jointed) to the adjacent stripe structures 520, such that the light leakage problem due to the connections between the convention microstructures and the flat optical surface of the light guide plate as described in the "Description of Related Art" does not occur. On the other hand, the design principles of the first light active surface 531 and the second light active surface 532 are respectively similar to the design principles of the aforementioned first light active surface 123a and 223a and the second light active surface 123b and 223b. The first light active surface 531 and the second light active surface 532 are inclined at different angles, and the area of the second light active surface 532 which directly receives light can be designed to be greater than the area of the first light active surface 531, so as to increase the amount of light reflection, thereby increasing light utilization efficiency.

It is noted that, in the present embodiment, each of the light-adjusting structures 530 has a size which becomes greater increased distance from the light-incident surface 511, and the size is irrelevant to the distance G1 between the adjacent two stripe structures 520. In a case of a light guide plate which only has stripe structures, a phenomenon of regular bright and dark stripes is likely occurred on the light guide plate due to the constant distance G1 between the adjacent stripe structures. Therefore, the light-adjusting structures of the present invention are used to be disposed between every two adjacent stripe structures to cut off the bright and dark stripes, thereby achieving a uniform light effect. Moreover, each of the light-adjusting structures 530 has a size which becomes greater with increased distance from the light-incident surface 511. Therefore, for an area of the light guide plate with weaker brightness away from the light-incident surface 511, the light-adjusting structures 530 with greater size can guide more light out of the light guide plate. Compared with an area of the light guide plate with stronger brightness near the light-incident surface 511, the light-adjusting structures 530 with smaller size can guide less light out of the light guide plate. Accordingly, different sizes of the light-adjusting structures 530 can improve the light uniformity of the light guide plate. On the other hand, by overlapping the light-adjusting structures with the adjacent stripe structures, the light leakage problem from the connections between the side portions of the light-adjusting structures and a flat optical surface of the light guide plate can be resolved.

Figure 7:
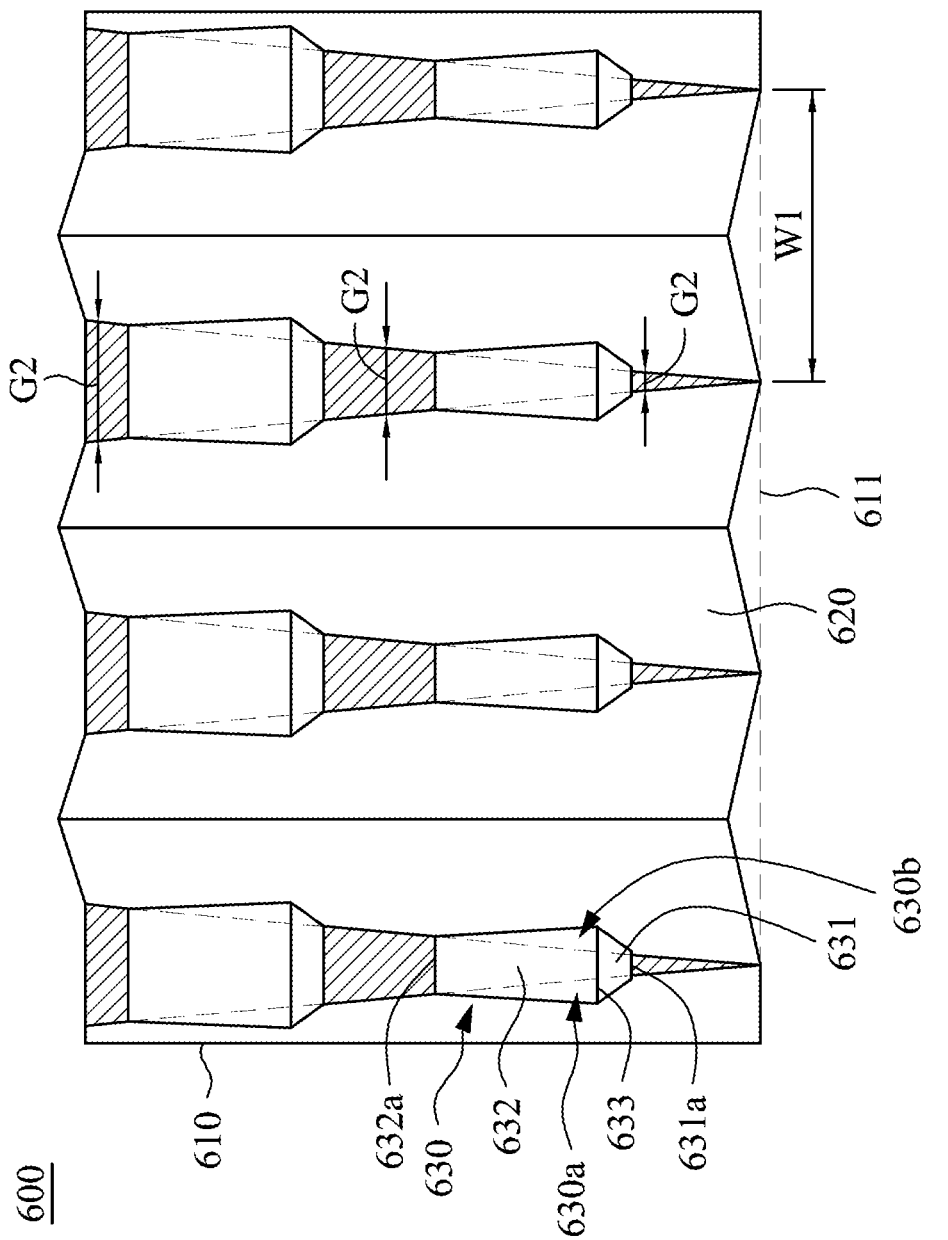
FIG. 7 is a schematic partial structural diagram showing a light guide plate in accordance with a sixth embodiment of the present invention.

Referring to FIG. 7, FIG. 7 is a schematic partial structural diagram showing a light guide plate 600 in accordance with a sixth embodiment of the present invention. The light guide plate 600 of the present embodiment includes a main body 610, plural stripe structures 620 and plural light-adjusting structures 630. An extending direction of the stripe structures 620 is vertical to a light-incident surface 611 of the main body 610. In the present embodiment, a width W1 each of the stripe structures 620 is gradually decreasing from one end each of the stripe structures 620 located near the light-incident surface 611 to the other end of each of the stripe structures 620 located away from the light-incident surface 611. Therefore, distances G2 between side edges of two adjacent stripe structures 620 can be varied rather than being fixed, thereby decreasing the chance of the occurrence of the regular light and dark stripes on the light guide plate 600.

In the present embodiment, the light-adjusting structures 630 are disposed between every two adjacent stripe structures 620. Moreover, each of the stripe structures 620 has a width W1 which decreases from one end near the light-incident surface to the other end away from the light-incident surface 611, such that the distance G2 between the side edges of every two adjacent stripe structures 620 becomes greater. For example, as shown in FIG. 7, each of the oblique line areas has a wide end and a narrow end, and the wide end is away from the light-incident surface 611. Each of the light-adjusting structures 630 has a size which becomes greater with increased distance from the light-incident surface 611, such that widths of each of end edges 631a and 632a of each of the light-adjusting structures 630 become wider. In other words, in the present embodiment, each of the light-adjusting structures 630 has a size which becomes greater with increased distance from the light-incident surface 611, and the size of each of the light-adjusting structures 630 is relevant to the distance G2 between the stripe structures 620. For example, as shown in FIG. 7, the size of the light-adjusting structure 630 located near the light-incident surface 611 is smaller than that of the light-adjusting structure 630 located away from the light-incident surface 611.

Referring to FIG. 7, each of the light-adjusting structures 630 has a first light active surface 631 and a second light active surface 632, and the first light active surface 631 faces towards the light-incident surface 611, and the second light active surface 632 faces away from the light-incident surface 611. In the present embodiment, the first light active surface 631 and the second light active surface 632 of each of the light-adjusting structures 630 are continuously arranged along a direction which is vertical to the light-incident surface 611. The first light active surface 631 and the second light active surface 632 of each of the light-adjusting structures 630 are connected to each other to form a junction line 633 which is parallel to the light-incident surface 611. In addition, each of the light-adjusting structures 630 has a first flank portion 630a and a second flank portion 630b which are respectively located at two opposite sides of the junction line 633 and are overlapped on the adjacent stripe structures 620. In other words, the first flank portion 630a and the second flank portion 630b of each of the light-adjusting structures 630 are directly connected to the stripe structures 620, thus resolving the light leakage problem due to the connections between the convention microstructures and the flat optical surface of the light guide plate as described in the "Description of Related Art".

In addition, in the embodiment of FIG. 6 and FIG. 7, because each of the light-adjusting structures has the first flank portion and the second flank portion respectively extending from two opposite sides of the junction line, and lengths of the end edges are shorter than a length of the junction line of each of the light-adjusting structures, so that each of the first light active surface and the second light active surface is formed in trapezoid. If the light-adjusting structures do not have the design of the first flank portion and the second flank portion and a length of end edge is equal to the junction line, the first light active surface and the second light active surface are in shape of rectangular. Because the area of trapezoid is greater than the area of rectangular shape, the trapezoid first light active surface and the trapezoid second light active surface can reflect more light, thereby increasing light utilization efficiency.

On the other hand, the design principles of the first light active surface 631 and the second light active surface 632 are respectively similar to the design principles of the aforementioned first light active surface 123a and 223a and the second light active surface 123b and 223b. The first light active surface 631 and the second light active surface 632 are inclined at different angles, and the area of the second light active surface 632 which directly receives light can be designed to be greater than the area of the first light active surface 631, so as to increase the amount of light reflection, thereby increasing light utilization efficiency. In addition, each of the light-adjusting structures 630 has a size which becomes greater with increased distance from the light-incident surface 611, so that the area of the second light active surface 632 of one of the light-adjusting structures 630 which is away from the light-incident surface 611 is greater than the area of the second light active surface 632 of one of the light-adjusting structures 630 which is near the light-incident surface 611, such that the amount of light reflection emitted from a portion of the main body 610 away from the light-incident surface 611 can be increased, thereby increasing light utilization efficiency.

Figure 8:
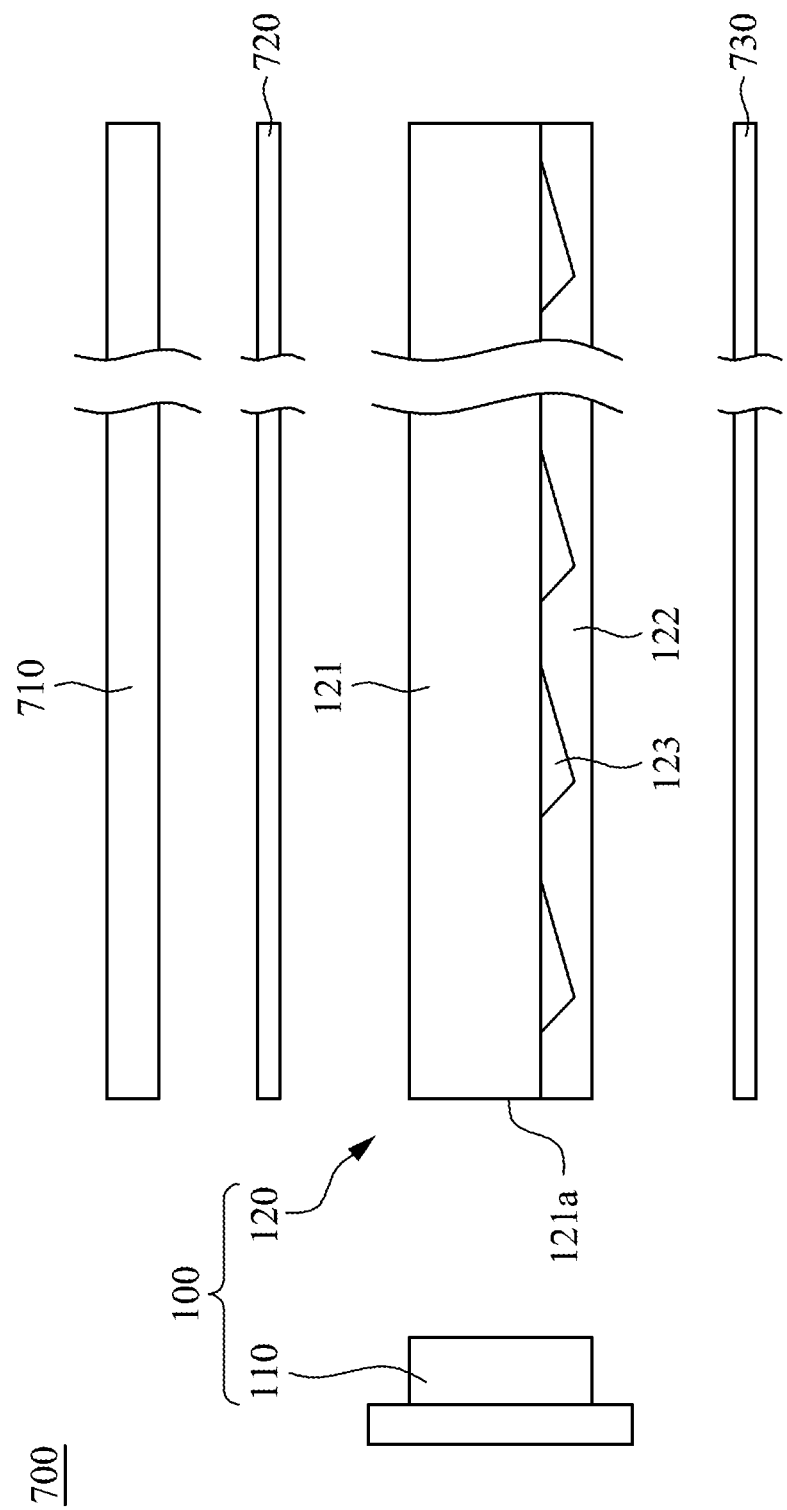
FIG. 8 is a schematic diagram showing a display device in accordance with an embodiment of the present invention.

Referring to FIG. 8, FIG. 8 is a schematic diagram showing a display device 700 in accordance with an embodiment of the present invention. The display device 700 of the present embodiment includes the backlight module 100 as shown in FIG. 2A, a display panel 710, at least one film 720 and a reflecting film 730. As shown in FIG. 8, the film 720 is disposed in front of the light guide plate 120 of the backlight module 100, and the reflecting film 730 is disposed behind the light guide plate 120 of the backlight module 100. The display panel 710 is disposed at a light emitting side of the light guide plate 120 of the backlight module 100. Therefore, by applying the light guide plate 120 having the design of the stripe structures 122 and the light-adjusting structures 123 o to the display device 700 can increase the utilization efficiency of light which is provided by the light source 110 and enters the light guide plate 120. It is noted that, the backlight module 100 shown in FIG. 2A is merely used as an example which can be applied to the display device 700 for explanation, and embodiments of the present invention are not limited thereto. In other embodiments, other backlight modules, such as the backlight modules having the light guide plate 200, 500 or 600, or the backlight module 300, or the backlight module 400 in other aforementioned embodiments also can be applied to a display device, so as to achieve the same effect.

According to the aforementioned embodiments of the present invention, the light guide plate of the present invention has stripe structures and light-adjusting structures disposed between every two adjacent stripe structures, such that the stripe structures are directly formed as side portions of the light-adjusting structures, thereby preventing the light leakage problem on the sides of the conventional microstructures. In other words, because each of the light-adjusting structures is not directly connected to the flat surface of the light guide plate, the light leakage problem due to the connections between the convention microstructures and the flat optical surface of the light guide plate as described in the "Description of Related Art" can be resolved. In addition, the light active surfaces of each of the light-adjusting structures have different inclinations, which can increase the amount of light reflection or guide the light, thereby increasing light utilization efficiency. Because the stripe structures are directly formed as side portions of the light-adjusting structures, the processing time of the light guide plate can be reduced, and the inclination of the light active surfaces can be precisely controlled, thereby achieving required optical effect.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide plate, comprising:
a main body comprising a light-incident surface and an optical surface connected to the light-incident surface;
a plurality of stripe structures disposed on the optical surface; and
a plurality of light-adjusting structures disposed between every two adjacent stripe structures, wherein each of the light-adjusting structures comprises a first light active surface and a second light active surface connected to the first light active surface;
wherein the first light active surface faces towards the light-incident surface, and the second light active surface faces towards a side of the main body which is opposite to the light-incident surface, wherein the first light active surface and the second light active surface are inclined towards different directions and formed a non-symmetrical shape, and a first included angle is formed between the first light active surface and the optical surface, and a second included angle is formed between the second light active surface and the optical surface, wherein each of the first included angle and the second included angle is an acute angle; wherein
the first light active surface and the second light active surface of each of the light-adjusting structures are connected to form a junction line, wherein the junction line is parallel to the light-incident surface;
each of the first light active surface and the second light active surface of each of the light-adjusting structures has an end edge and two side edges, wherein the end edge is parallel to the junction line, and the side edges are not parallel to the junction line;
each of the light-adjusting structures comprises a first flank portion and a second flank portion, and the first flank portion and the second flank portion of each of the light-adjusting structures are respectively located at two opposite sides of the junction line and overlap with their adjacent stripe structures, so that lengths of the end edges of respective first light active surface and second light active surface are smaller than a length of the junction line.

2. The light guide plate of claim 1, wherein side edges of the first light active surface and the second light active surface of each of the light-adjusting structures are connected to surfaces of striped structures adjacent thereto.

3. The light guide plate of claim 1, wherein an extending direction of each of the striped structures is vertical to an extending direction of the light-incident surface.

4. The light guide plate of claim 1, wherein
the main body has an opposite light-incident surface which is opposite to the light-incident surface; and
one end of each of the striped structures is connected to the light-incident surface, and the other end of each of the striped structures is connected to the opposite light-incident surface.

5. The light guide plate of claim 1, wherein the first angle is greater than the second angle.

6. The light guide plate of claim 1, wherein the light-adjusting structures are continuously or non-continuously arranged along the striped structures.

7. The light guide plate of claim 1, wherein
the light-adjusting structures are arranged along the striped structures; and
each of the light-adjusting structures has a size which becomes greater with increased distance from the light-incident surface.

8. The light guide plate of claim 1, wherein
the light-adjusting structures are arranged along the striped structures; and
distances between every two adjacent light-adjusting structures decrease along a direction from the light-incident surface to an opposite light-incident surface which is away from the light-incident surface.

9. The light guide plate of claim 1, wherein the striped structures are continuously arranged or non-continuously arranged.

10. The light guide plate of claim 1, wherein
the first light active surface and the second light active surface of each of the light-adjusting structures are arranged along a direction which is vertical to the light-incident surface.

11. The light guide plate of claim 10, wherein each of the stripe structures has side edges, and a distance between the side edges of two adjacent stripe structures is the same from one end of each of the stripe structures located near the light-incident surface to the other end of each of the stripe structures located away from the light-incident surface.

12. The light guide plate of claim 10, wherein each of the stripe structures has side edges, and a distance between the side edges of two adjacent stripe structures is gradually increasing from one end of each of the stripe structures located near the light-incident surface to the other end of each of the stripe structures located away from the light-incident surface.

13. A backlight module, comprising:
a light guide plate as claimed in claim 1;
at least one film disposed in front of the light guide plate;
a reflecting film disposed behind the light guide plate; and
a light source disposed adjacent to the light-incident surface of the light guide plate.

14. A display device, comprising:
a light guide plate as claimed in claim 1;
at least one film disposed in front of the light guide plate;
a reflecting film disposed behind the light guide plate; and
a light source disposed adjacent to the light-incident surface of the light guide plate; and
a display panel disposed in front of the at least one film.

15. A light guide plate, comprising:
a main body comprising a light-incident surface and an optical surface connected to the light-incident surface;
a plurality of stripe structures disposed on the optical surface; and
a plurality of light-adjusting structures disposed between every two adjacent stripe structures, wherein each of the light-adjusting structures comprises a first light active surface and a second light active surface connected to the first light active surface;
wherein the first light active surface faces towards the light-incident surface, and the second light active surface faces towards a side of the main body which is opposite to the light-incident surface, wherein the first light active surface and the second light active surface are inclined towards different directions and formed a non-symmetrical shape, and a first included angle is formed between the first light active surface and the optical surface, and a second included angle is formed between the second light active surface and the optical surface, wherein each of the first included angle and the second included angle is an acute angle; wherein
the first light active surface and the second light active surface of each of the light-adjusting structures are arranged along a direction which is vertical to the light-incident surface;
the first light active surface and the second light active surface of each of the light-adjusting structures are connected to form a junction line, wherein the junction line is parallel to the light-incident surface; and
each of the first light active surface and the second light active surface of each of the light-adjusting structures has two side edges, wherein the side edges are not parallel to the junction line, and the side edges are connected to surfaces of the adjacent striped structures.

16. The light guide plate of claim 15, wherein
the main body has an opposite light-incident surface which is opposite to the light-incident surface;
a distance between the junction line of each of the light-adjusting structures and the optical surface is consistent from the light-incident surface to the opposite light-incident surface.

17. A backlight module, comprising:
a light guide plate as claimed in claim 15;
at least one film disposed in front of the light guide plate;
a reflecting film disposed behind the light guide plate; and
a light source disposed adjacent to the light-incident surface of the light guide plate.

18. A display device, comprising:
a light guide plate as claimed in claim 15;
at least one film disposed in front of the light guide plate;
a reflecting film disposed behind the light guide plate; and
a light source disposed adjacent to the light-incident surface of the light guide plate; and
a display panel disposed in front of the at least one film.

* * * * *